(12) United States Patent
Ohira et al.

(10) Patent No.: US 6,735,735 B1
(45) Date of Patent: May 11, 2004

(54) FORWARD ERROR CORRECTING CODE ENCODING EQUIPMENT, FORWARD ERROR CORRECTING CODE DECODING EQUIPMENT, AND TRANSMISSION APPARATUS

(75) Inventors: Masaki Ohira, Yokohama (JP); Masatoshi Shibasaki, Yokohama (JP); Yusuke Yajima, Yokohama (JP); Takashi Mori, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/387,895

(22) Filed: Sep. 1, 1999

(30) Foreign Application Priority Data

Jul. 12, 1999 (JP) .......................................... 11-197023

(51) Int. Cl.$^7$ ............................................. H03M 13/00
(52) U.S. Cl. ........................ 714/776; 714/774; 714/775
(58) Field of Search ................................. 714/752, 775, 714/776, 777, 781, 782, 783, 784, 785, 774; 370/367, 391, 396, 400

(56) References Cited

U.S. PATENT DOCUMENTS

| | | | | |
|---|---|---|---|---|
| 4,755,993 A | * | 7/1988 | Grover | 370/505 |
| 4,910,754 A | * | 3/1990 | Allen et al. | 375/357 |
| 5,453,997 A | * | 9/1995 | Roney, IV | 714/774 |
| 5,541,955 A | * | 7/1996 | Jacobsmeyer | 375/222 |
| 5,579,303 A | * | 11/1996 | Kiriyama | 370/252 |
| 5,668,810 A | * | 9/1997 | Cannella, Jr. | 370/392 |
| 5,699,369 A | * | 12/1997 | Guha | 714/774 |
| 5,854,840 A | * | 12/1998 | Cannella, Jr. | 380/268 |
| 5,856,988 A | * | 1/1999 | Kiriyama | 714/774 |
| 5,991,308 A | * | 11/1999 | Fuhrmann et al. | 370/395.53 |
| 5,999,905 A | * | 12/1999 | Isozaki | 704/500 |
| 6,044,485 A | * | 3/2000 | Dent et al. | 714/774 |
| 6,088,351 A | * | 7/2000 | Jenkin et al. | 370/347 |
| 6,112,325 A | * | 8/2000 | Burshtein | 714/774 |
| 6,182,264 B1 | * | 1/2001 | Ott | 714/774 |
| 6,205,187 B1 | * | 3/2001 | Westfall | 375/341 |
| 6,230,297 B1 | * | 5/2001 | Bentall et al. | 714/758 |
| 6,233,709 B1 | * | 5/2001 | Zhang et al. | 714/774 |
| 6,336,192 B1 | * | 1/2002 | Sakamoto et al. | 713/503 |

OTHER PUBLICATIONS

Nortel Networks, "Design Consideration for SONET/SDH In–Brand FEC", Tim Armstrong.

* cited by examiner

Primary Examiner—Christine T. Tu
Assistant Examiner—Joseph D. Torres
(74) Attorney, Agent, or Firm—Kenyon & Kenyon

(57) ABSTRACT

An encoder adds an identifier, being different when the coding should be done or not, into a predetermined location in, an original signal, while a decoder reads out the identifier added and detects the condition of coding, so as to decide the execution (ON) of the decoding process to be done or not, automatically. Further, in each of the encoder and the decoder, there is provided a delay output portion, which provides an output treated with only a specific delay but not executing the coding/decoding thereon, separately from a coding process portion or a decoding process portion, wherein a selection can be made, at which one of the signals from the respective process portions and the delay output portion should be outputted, by a setup in an outside operation system with use of a selector.

12 Claims, 14 Drawing Sheets

FORWARD ERROR CORRECTING CODE ENCODING EQUIPMENT, FORWARD ERROR CORRECTING CODE DECODING EQUIPMENT, AND TRANSMISSION APPARATUS

BACKGROUND OF THE INVENTION

FIELD OF THE INVENTION

The present invention relates to a forward error correcting code encoding equipment, a forward error correcting code decoding equipment and a transmission apparatus with use thereof, in particular, being suitable for an optical transmission network.

Following the development of technologies in the field of digital signal processing, including such as a LSI and so on, the technologies of encoding and decoding of forward error correcting code are applied to or used widely in various technical fields for the purpose of ensuring high quality of signals. In particular, in an engineering field, a code, such as a so-called systematic code, is mainly used due to transparency of the information thereof, among the block codes having mathematically well-regulated systems therein. In this code, a series of continuous signals are divided into a plurality of constant blocks, and are coded or encoded by each block, wherein it is characterized that only a check bit is added into a vacant area predetermined within the signal, but no operation is made on the original signal information of this kind of block codes were previously well-known a Hamming code, a BCH code, and a Reed-Solomon code, etc., and they are actually applied to. Hereinafter, the coding or decoding of the forward error correcting code is called only by coding or decoding.

Then, for a system introducing the forward error correcting code therein, it is established with an assumption of deterioration of signal quality due to mixture of noises in each of processes, including reading and reservation of signals, signal transmission, signal processing, etc. For example, in such a manner that the signal is always coded in the each process, and then it is always treated by decoding process thereafter.

Optical transmission is widely spread in recent years, which enables data transmission with a large volume or capacity thereof. This optical transmission adopts optical fibers, i.e., a transmission path of relatively high quality, as a medium thereof, having a bit error rate equal or less than $10^{-9}$, and therefore it is not necessary to presume the adoption of the forward error correcting codes in the system. As a representative one of such the optical transmission can be listed a digital synchronization transmission system, wherein regulations are existing worldwide. This system is widely spread in the networks of truck or main line systems of the world, as SDH (Synchronous Digital Hierarchy) (established 1988) which was determined as the recommendation G.707 and so on by International Telecommunication Union (hereinafter, ITU-T), and as SONET (Synchronous Optical Network) (established 1991) which was determined as the standard T1.105 by American National Standardization Institute (hereinafter, ANSI). Those standards, except for a submarine transmission system wherein signals must be transferred very long distance, are not positive nor aggressive for adoption of the forward error correcting code.

However, following advances on the large capacity with time division multiplex in the digital synchronization transmission method, the signal is narrowed in the bit length-and is easily influenced by an affect due to various dispersions, as the inherent physical characteristics of the optical fiber, and as a result, the signals are deteriorated in quality thereof, as well as the transmission distance is limited therewith. Then, as a means effective to compensate for the deterioration of the signal quality, the forward error correcting code is studied. As an example of the code, in Japanese patent Laying-Open No. Hei 7-280058 (1995) is shown the Reed-Solomon code for a single error correction.

Further, on the other hand, a method of wavelength division multiplex is also spread widely, but since a degree of separation is deteriorated when the lights transmitting in a piece of optical fiber come to close to each other in the distance of wavelength thereof, the transmission distance is restricted thereby when the degree of multiplication is increased. In this instance, also introduction of the forward error correcting codes is an effective method for compensation thereof.

It is not necessarily true that in the optical transmission network, such as nodes. (multiplexing equipment and regenerating equipment) constructing the digital synchronous transmission network, always support the same forward error correcting codes. Namely, all of the nodes are not necessarily supplied by the same producer or manufacturer, and also there can be a node(s) which cannot support the forward error correcting codes even if it (they) is supplied by the same producer or manufacturer, depending upon the difference of time of purchasing thereof.

In this manner, under the situation where there are mixed nodes being different from one another in the transmission network, it cannot be guaranteed that the signals received at any node is necessarily coded, and therefore it is impossible to execute the decoding always at the receiver side. This is because miss corrections are generated in the signals when the signals which are not coded properly are decoded.

Further, in general, by using the forward error correction, since miss corrections come to be large in the number when the error rate of the signals is high, there can be considered a method in which the decoding is performed only when the error rate is relatively low, while it is not performed when the error rate is deteriorated. Alternatively, with a transmission medium of relatively good quality, such as the optical fibers and so on, there also can be considered a method of using thereof, in which the decoding is performed only when the error rate is deteriorated in such degree that it does not cause the miss correction, but the decoding is not performed under other situations.

From the above, the decoding equipment need not only ON of the decoding operation (i.e., decode ON) but also a process of not decoding (i.e., decode OFF), and also there is a necessity that a network management system or an operator must setup ON/OFF of the decoding operation for each node of the network.

Regarding the coding, since it is systematic code, there is given no ill influence even if it executes the coding operation always, irrespective of the opposing node(s).

As an example of supervision of the above-mentioned error rate, in the transmission networks such as the SDH or SONET, the number of error bits is detected for each of multiplex sections and for each of regeneration sections on the basis of BIP (Bit Interleaved Parity) of B1 byte or B2 byte. Therefore it is possible for the network management system or the operator to capture the number of error bits and the bit error rate between the respective nodes.

Next, if the transmission network comes to be complex or is altered in the construction thereof, it is difficult for the network management system which is managing the transmission network, to grasp in which node section the error correction is applicable or not, or to make an instruction. to execute the error correction. This may sometimes cause that non-encoded signals to be erroneously decoded Further, in the decoding processes, there is caused delay time corresponding to one coding block or more than that. Here, explanation will be given on generation of the delay time by the decoding processes under the decode ON condition, by referring to FIG. 7 showing a timing chart for an explanation of generation of the delay.

The data inputted into a decoder is outputted therefrom, with a time delay "Tm", as indicated in FIG. 7. Calculating syndrome on the data of the coding block 1 which is inputted into the decoder, the syndrome calculation of the coding block 1 is completed at the time when the bit at the end of the coding block 1 is inputted. Next, error positions and error values will be calculated upon the basis of the calculated syndrome, however there is needed a specific calculation time (Tj) depending upon code format thereof, as well as a calculation circuit therefor. As a result of this, the time when starting the output of the corrected data of the coding block 1 is at a time point of counting up "time for 1 coding block+Tj" starting from a time point of inputting into the decoder, i.e., after the "Tm". For the coding blocks flowing thereafter, there are also generated the delay "Tm"s in the same manner.

On the other hand, the delay will not occur under the condition of the decode OFF. This is because the data inputted into the decoder is outputted as it is, with the same phase thereof, and therefore it can be considered that a time relationship between the input data and the output data is kept to be equal to each other.

When the network management system or the operator exchanges or alters the decoding operation from OFF condition into ON condition, there occurs a jump in the phase corresponding to the decoding delay mentioned in the above. In more detail, said information is shifted backwards by the "Tm" on the time axis, therefore a portion of the signal is outputted in duplicate. For example, when exchange is made at a time point during the input of the coding block 2 (i.e., when outputting it at the same time),the data of the coding block 1 is outputted from on a_way thereof just after the coding block 2 is outputted until on the way thereof.

Accordingly, the portion of data of the coding block 1, being outputted previously, and a portion of data of the coding block 2 , being also outputted previously, (sum of both is equal to the Tm in time) are outputted, again (not shown in figure).

Also, on the contrary to this, when the decoding operation is exchanged from ON condition into OFF condition, there also occurs a jump in the phase, and said information is shifted forwards on the time axis, and therefore the signals are outputted with omission of a part thereof. For example, in FIG. 7, if it is exchanged at the time point when outputting the coding block 1 during the inputting of the coding block 2, a portion of data of the coding block 1 which has not yet been inputted, all data of the coding block 2, and a portion of data of the coding block 3 which was inputted previously (the sum of those three is equal to the Tm in time) will not be outputted. Accordingly, the coding block 3 is outputted from on a halfway thereof just after the data of the coding block 1 is outputted on the way thereof, thereby causing the loss or omission of the data.

In any event, the phase jump, for one (1) coding block at the lowest, can be observed at an upper client side (i.e., a side which receives the signal in down stream) through the exchange operation between ON and OFF in the decoding operation, and there would be caused a condition of instantaneous or abrupt interruption, such as a miss-synchronization of the frame, thereby bringing about large problems in reliability of the network.

SUMMARY OF THE INVENTION

An object, according to the present invention, is to provide a transmission system, as well as a transmission apparatus, an encoder and a decoder for constructing the transmission system, wherein an operator managing the network can easily keep the system in operation, without necessity of deciding whether the decoding is available for each of the transmission sections, even when the structure of the network becomes complex or is altered.

Further, another object, according to the present invention, is to provide a transmission apparatus, an encoder and a decoder, and a management method for a transmission network, wherein a control of changing over ON/OFF between the coding and the decoding can be performed freely, without giving ill influence due to the phase jump :upon the signals on a circuit under the operation of service thereof.

For achieving such objects mentioned above, in an encoder and a decoder according to the present invention, there is provided a delay circuit portion, which provides an output treated with only a specific delay but not executing the coding/decoding thereon, separately from a coding process portion or a decoding process portion. And, when the coding/decoding should not be executed on the nodes each constructing the network, a network management system or an operator outside can select an output from that delay circuit portion.

Further, the encoder according to the present invention adds an identifier, being different in a case when the coding should be done or not, into a predetermined location in an original signal, while the decoder reads out the identifier added and detects the condition of coding, so as to decide the execution of the decoding process, automatically.

BRIEF DESCRIPTION OF THE DRAWINGS

Preferred embodiments of the present invention will now be described in conjunction with the accompanying drawings, in which.

DETAILED DESCRIPTION OF PREFERRED EMBODIMENTS

Hereinafter, embodiments according to the present invention will be fully explained by referring to the attached drawings.

Signals which are applied into the present embodiments are ones upon which can be applicable the systematic coding thereof, i.e., each series of signals can be divided into coding blocks of a constant length, and each includes a vacant area for each of the coding blocks, being enough to store check bits therein. For example, a transmission signal of SDH is a signal which is framed by a cycle of 125 microseconds, and it can be divided into the code clocks of the constant length arbitrarily, wherein the check bit can be stored in an area (non-regulation area) where a method or manner of using thereof is not defined in a multiplex section overhead and a regeneration section overhead thereof, and therefore it can be contained in the category mentioned-above.

Figure 1:
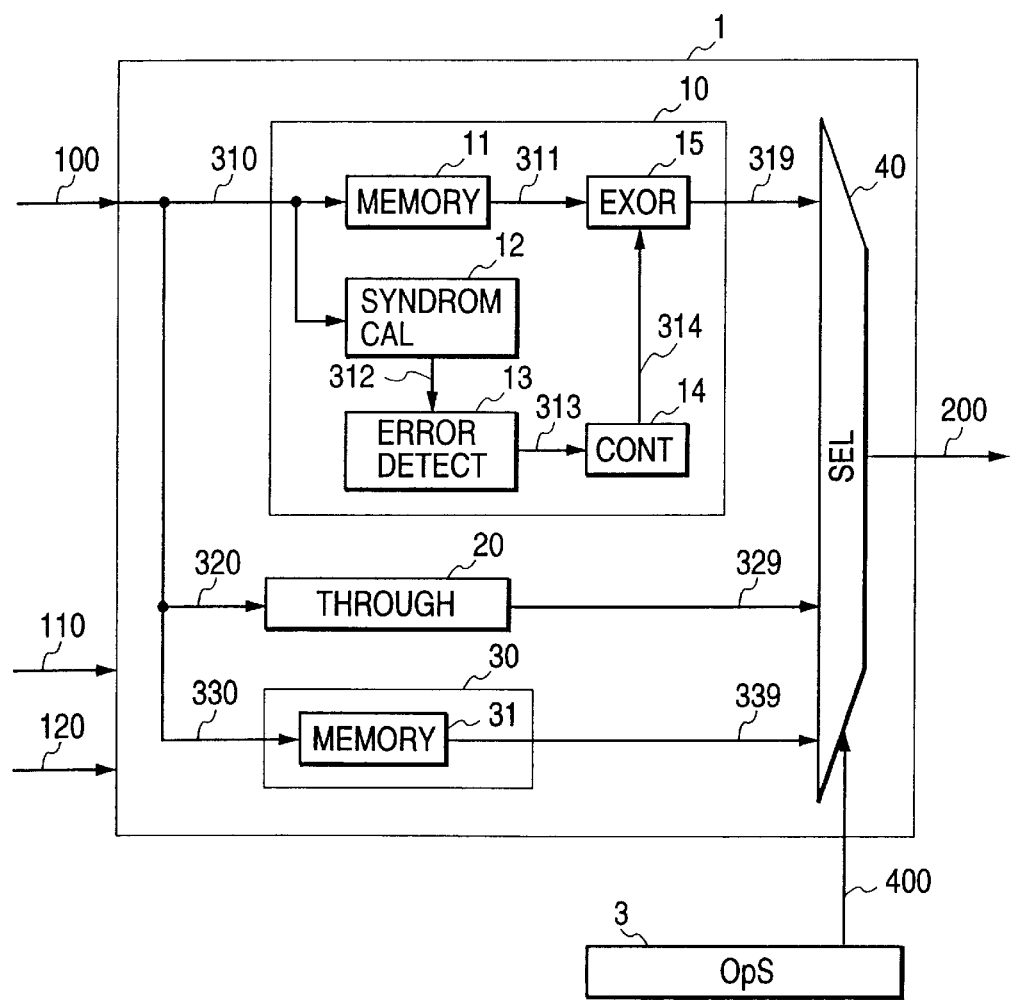
FIG. 1 shows a block diagram of a decoder of an embodiment according to the present invention.

An embodiment of a decoder according to the present invention is shown in FIG. 1. Here, FIG. 1 shows a block diagram of the decoder.

An input data 100 is a signal to be subject to decoding, and a block phase 110 is a trigger signal which indicates a head location of the coding block. And, an input clock 120 is a clock input having a same rate as the bit rate of the input data 100. Here, in a case where the head location of the coding block comes to be the same within a one frame cycle, the block phase 110 can be a trigger indicating the frame phase. In this case, it is enough to count up the head locations of the coding blocks within the decoder 1 upon the basis of the frame phases. Also, the input clock 120 may be as large an integer times the input data 100 in the cycle of one (1) bit thereof, and if it is more than two (2) times thereof, it is enough to divide the input clock 120 in the cycle thereof within the decoder 1 so as make it the bit rate of the input data 100.

The input data 100 is divided into three series of data 310, 320 and 330, being synchronized with one another, and each is input into a forward error correction process portion 10, into a through output portion 20, and into a delay output portion 30, respectively. From the forward error correction process portion 10, the through output portion 20, and the delay output portion 30 are output data 319, 329 and 339, respectively, so that they are input into a selector 40. In the selector 40, one of the data 319, 329 and 339 is selected upon the basis of an external control signal 400, so as to be provided as an output data 200 of the decoder.

The block phase 110 is used for the purpose of indicating where the head location of the coding block is positioned in the series of data, for the forward error correction process portion 10 and the delay output portion 30. Also, the decoder 1 is operated by the phase of the clock 120, i.e., the velocity thereof.

The feature of the present embodiment lies in the delay output portion 30. Hereinafter, every portion thereof will be explained in more detail.

While dividing the input data 310 into two (2) series so as to store them into a memory 11 one by one, the forward error correction process portion 10 inputs them into a syndrome computer or calculator 12. The syndrome computer 12 calculates out the syndrome upon the basis of the input data 310, and also outputs the result thereof as a syndrome 312 into an error computer 13. The error computer 13 calculates out the positions and the values of the errors existing in the coding blocks on the basis of the inputted syndrome 312, and outputs the result thereof as an error evaluation result 313 into an error correction controller 14. With the error evaluation result 313, in a case where the code is for plural forward error correcting codes, there exist a set of error positions, as well as a plurality set of the error values therein.

On the other hand, the data which are stored in the memory 11 are read out as the data 311 after passing a constant time ".Tm" from the time when the data is written, so that they come to be the same data series of the original data 310, and are output into a logical exclusive OR gate 1s. The error correction controller 14 outputs a correction data 314 into the logical exclusive OR gate 15 on the basis of the input error evaluation result 313 The correction data 314 is theoretically equal to the corresponding error value at the time when the location at which the error exists is output from the memory 11, while it is theoretically to be "zero" at the time when the location at which the error does not exist is output therefrom. The logical exclusive OR gate 15 outputs a logical exclusive summation of the output data from the memory 11 and the correction data 314 from the error correction controller 14, as a data 319 thereof.

Here, the "Tm" is a time in which the error correction controller 14 can necessarily output the correction data 314 for the coding block A from the time point when an arbitrary coding block A is input into the syndrome computer 12 among the signal series of the data 310, wherein it is an essential condition that it is at least more than the cycle of the coding block.

However, since the way of calculating the syndrome and the method of error evaluation are well-known, therefore, here the explanations thereon are omitted. In particular, when the code is a single forward error correcting cycle redundancy code, it is also well-known that, the syndrome computer 12, the error computer 13 and the error correction controller 14 are able to be achieved by simple feedback shift registers.

Next, the through output portion 20 outputs the data 329 just after inputting the data without operating on the contents of the data 320 inputted.

The delay output portion 30 writes the input data 330 into a memory 31. And in the same manner as in the memory 11, the data is read out as the data 319 so as to be made the same data series as the original data 330, after passing the constant time "Tm" from the time of writing.

The selector 40 selects the data 319 when the external control signal indicates the decoding, or the data 329 when it indicate non-execution of the decoding and no-delay, and it selects the data 339 when it indicates non-execution of the decoding and with the delay, so as to output the data 200, respectively. Also, no delay operation is treated within the selector. The external control signal 400 is a control signal from a device management system(s), a network management system(s) and an operator(s).

According to the present embodiment, an operator outside can obtain continuous data without the phase jump in the output data 20 even when she/he exchanges the decoding operation between execution (ON) and non-execution (OFF) on the input data 100, by selecting the data 319 when she/he wishes to execute the decoding or by selecting the data 339 when she/he does not execute the decoding, with the control of the selector 40 through the operating system 3, thereby avoiding the ill influence due to the phase jump onto the input data 100 which is under the operation of service.

Further, the memory 31 of the delay output portion 30 in FIG. 1 and the memory 11 of the error correction process portion 10 can be provided in common. In such instance, the input 339 to the selector 40 is obtained by dividing the output 311 from the memory 11.

Figure 2:
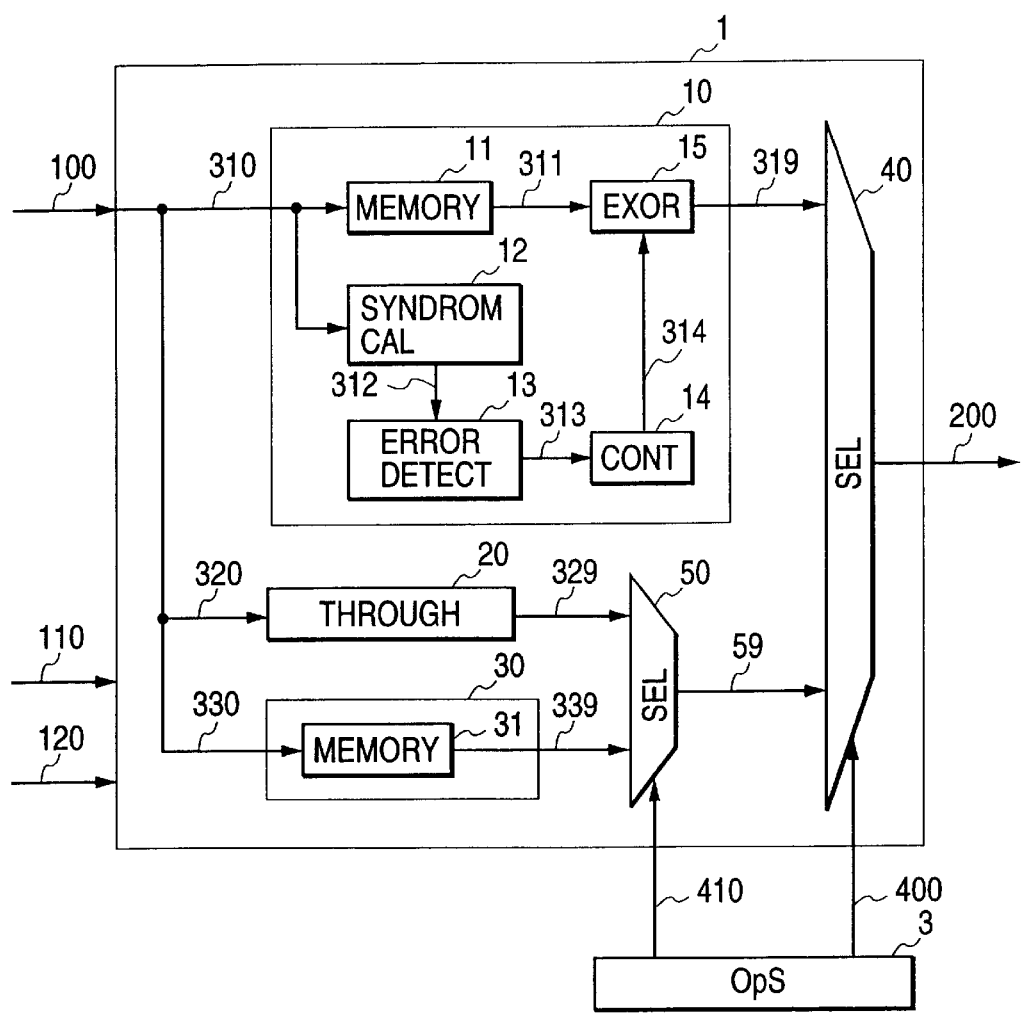
FIG. 2 shows a block diagram of an another decoder of an embodiment according to the present invention.

An another embodiment of the decoder according to the present invention is shown in FIG. 2. Here, FIG. 2 is the block diagram of the decoder.

The present embodiment is similar to that shown in FIG. 1, in the structure and the operation thereof, and only differs from it in an aspect that a selector 50 is provided at a front stage of the selector 40. That difference will be described in more detail below. The selector 50 receives the data 329 and 339 from the through output portion 20 and the delay output portion 30, respectively, and selects one of them upon the basis of the external control signal 410 so as to output it to the selector 40 as the data 59 thereto. Here, the selector 50 does not treat any delay in the inside thereof, in the same manner as in the selector 40.

The selector 40 receives the data 319 and 59 from the error correction process portion 10 and the selector 50, respectively, and it selects one of them upon the basis of the external control signal 400 so as to output it as the data 200. Namely, the selector 50 controls the selection of whether the delay operation should be treated or not when the decoding operation should not be executed, while the selector 40 only controls the selection of whether the decoding operation should be executed or not.

From this, the operator outside can control the selector 40 with ease, and also she/he can obtain the continuous data as the output data 20 without the phase jump, even when exchanging the decoding operation between ON and OFF thereof on the input data 100, only by controlling through the operating system 3, so that the data 339 is selected in advance by the selector 50, thereby avoiding the ill influence due to the phase jump upon the input data 100 which is under the operation of service thereof.

Figure 3:
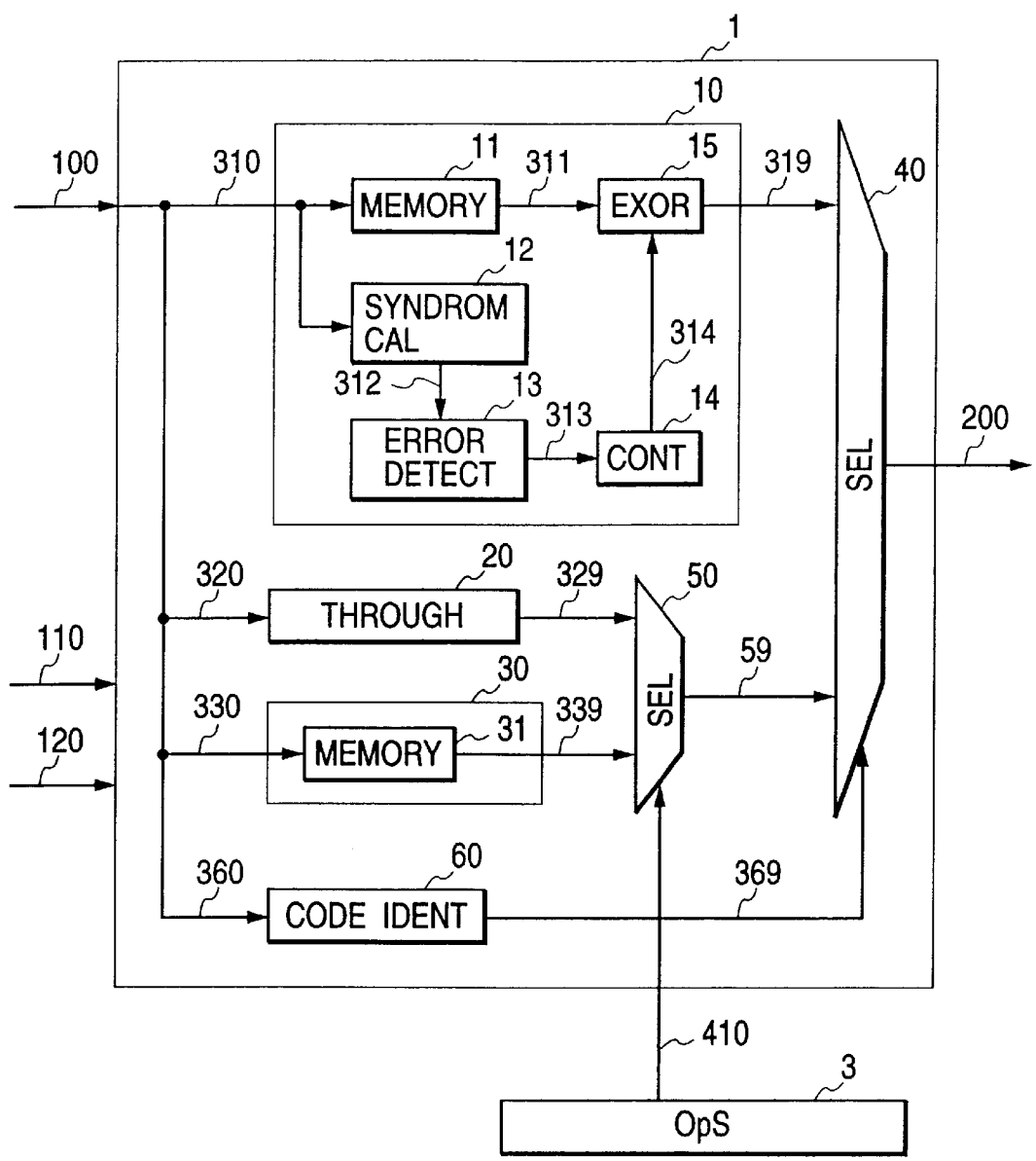
FIG. 3 shows a block diagram of an other decoder of an embodiment according to the present invention.

An other embodiment of the decoder according to the present invention is shown in FIG. 3. Here, FIG. 3 is the block diagram of the decoder.

The present embodiment is similar to that shown in FIG. 2, in the structure and the operation thereof, and it only differs from it in an aspect that the selector 40 can be controlled automatically. That difference will be described in more detail below.

First, the input data 100 is divided into four (4) series, i.e., the three (3) series of the data 310, 320 and 330, and a data 360 in addition thereof, and the data 360 is inputted into a coding identifier portion 60. This coding identifier portion 60 decides whether the data 360 is coded or not, so that it outputs the result thereof as a coding identification result 369. Namely, when it is decided to be coded, the coding identification result 369 is output so that the selector 40 selects the data 319, while when it is decided not to be coded, the coding identification result 369 is output so that the selector 40 selects the data 59. The decision in the coding identifier portion 60 is made on the basis of an identifier given when it is coded in an encoder outside corresponding to the present decoder. Namely, the encoder not shown in the figure inserts an identification pattern corresponding to the coding into a predetermined position in the vacant area where no information resides as the identifier, for each coding block. For example, in a case where the identifier is 1 byte, (AA) hex is inserted when it is to be coded, while (00)hex is inserted when not be coded. Here, ( )hex is an expression by hexadecimal notation. The coding identifier portion 60 of the decoder is able to decide whether it is coded or not by reading this identifier.

With this, the operator outside can obtain the continuous data with no phase jump in the output data 200, irrespective of the coding condition of the input data 100, without paying attention to whether it can be decoded or not, since the decoding operation/non-decoding operation is automatically selected depending upon the coding condition of the received signal, thereby avoiding the ill influence due to the phase jump upon the input data 100 which is under the operation of service thereof.

Further, in the decision in the coding identifier portion 60 can be added a protection condition in addition thereto. For example, when the pattern corresponding to the "coding" (for instance, the (AA) hex in the above-mentioned example) is detected continuously by n times or more, it is decided to be coded. Or, alternatively when the pattern corresponding to the "non-coding" (for instance, the (00)hex in the above-mentioned example) is detected continuously by m times or more, it is decided to be not coded. And if it is not in any one of those cases mentioned above, the condition being decided just before is maintained, and so on. Here, the n and m are arbitrary natural numbers, respectively, and they can be equal to each other.

Further, setting the value m to be smaller than n in the above protection condition, it is possible to immediately decide the non-coding condition so as to turn OFF the decoding operation, thereby reducing the period during when the miss correction may occur therein.

Figure 4:
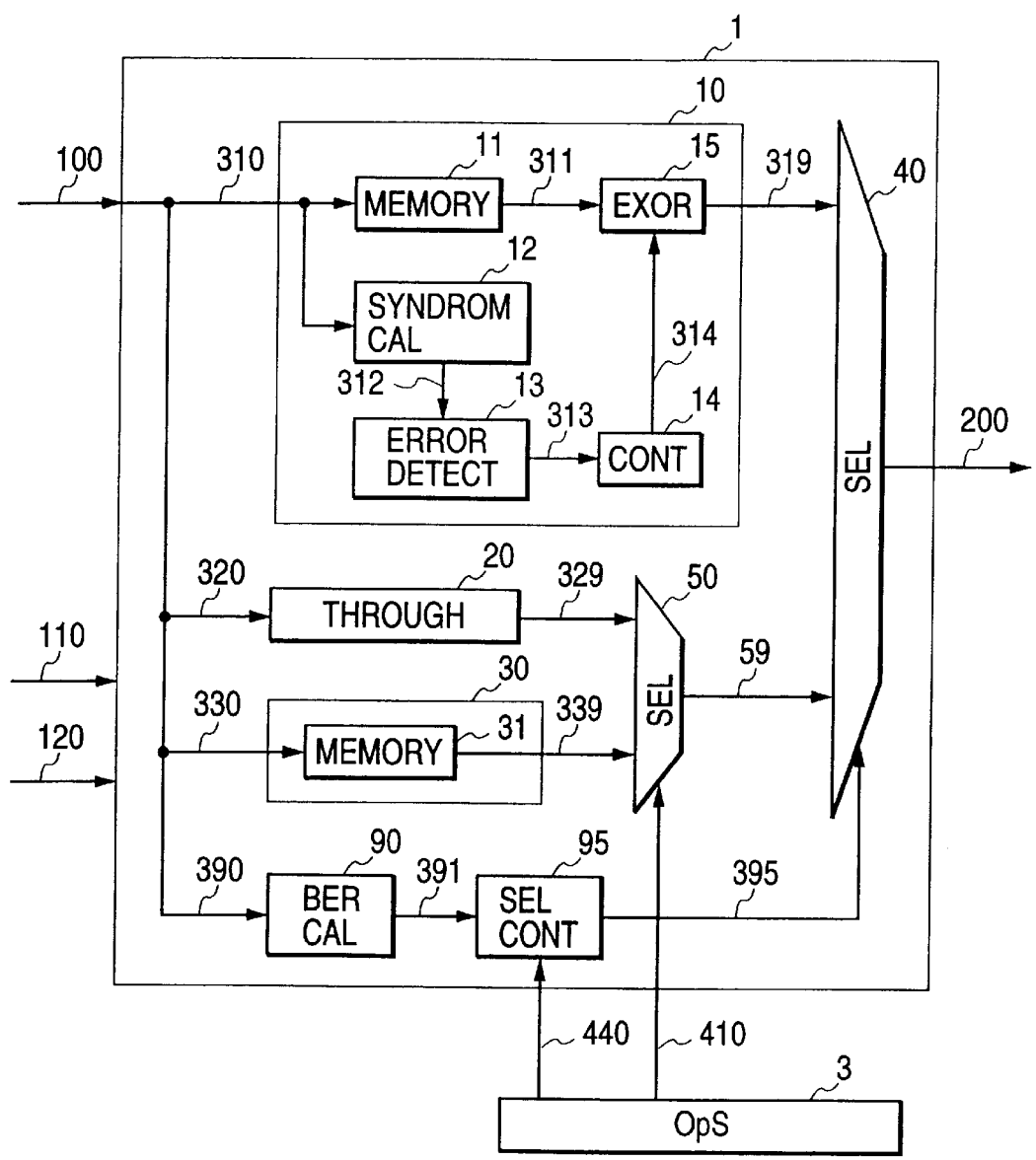
FIG. 4 shows a block diagram of a further other decoder of an embodiment according to the present invention.

A further other embodiment of the decoder according to the present invention is shown in FIG. 4. Here, FIG. 4 is the block diagram of the decoder.

The present embodiment is similar to that shown in FIG. 2, in the structure and the operation thereof, but it differs therefrom in an aspect that the selector 40 can be controlled automatically on the basis of the error rate of the received data. That difference will be described in more detail below. First of all, it is assumed that the input data 100 includes BIP byte or CRC byte, each being an error detection code for detecting the error number. For example, in the SDH or the SONET signal, the number of parity inconsistencies can be detected by parity calculation by using B1 byte or B2 byte, and also the error number and the error rate can be obtained therefrom.

This input data 100 is divided into four (4) series, i.e., the three (3) series of the data 310, 320 and 330, and a data 390 in addition thereof, and the data 390 is input into an error rate calculation portion 90. The error rate calculation portion 90 calculates out the error number of the input data upon the basis of the error detection codes of the input data and converts it into the error rate so as to output it to the selector controller portion 95 as a detected error rate 391. The selector controller portion 95, in which a threshold value is setup in advance by the external control signal 440, compares the threshold value of the error rate to the detected error rate, so that a selector control signal 395 is output for controlling the selector 40. The selector control signal 395, for example, selects the data 319 from the error correction process portion 10 when it is less than the threshold value, and selects the data 59 from the selector, 50 when it exceeds the threshold value, or vice versa.

Also, it is possible to use the forward error correction codes in place of using the error detection codes for the purpose of calculation of the error number. In this case, since the error number can be seen easily from the error estimation result 313 as the result of the calculation by the error calculating portion 13, it is enough for the error rate calculating portion 90 to convert it into the error rate.

Further, in place of the above-mentioned error rate, it is also possible to detect the error bit number or the error block number, so as to control the selector 40 by comparing it with the threshold value.

According to the present embodiment, the operator outside can obtain continuous data as the output data 20 without the phase jump even when she/he exchanges the decoding operation between ON and OFF thereof on the input data 100, only by controlling the selector 50 in advance so that the data 339 is selected thereby, i.e., the execution or non-execution of the operation is automatically selected depending upon the error rate of the received signal, without paying attention to the fact whether the decoding can be executed or not, thereby avoiding the ill influence due to the phase jump upon the input data 100 which is under the operation of service thereof.

However, in each of the embodiments shown in FIGS. 2 through 4, the memory 31 of the delay output portion 30 and the memory 11 of the error correction processing portion 10 may be provided in common. In this case, the input 339 into the selector 50 is divided from the output 311 of the memory 11.

Figure 5:
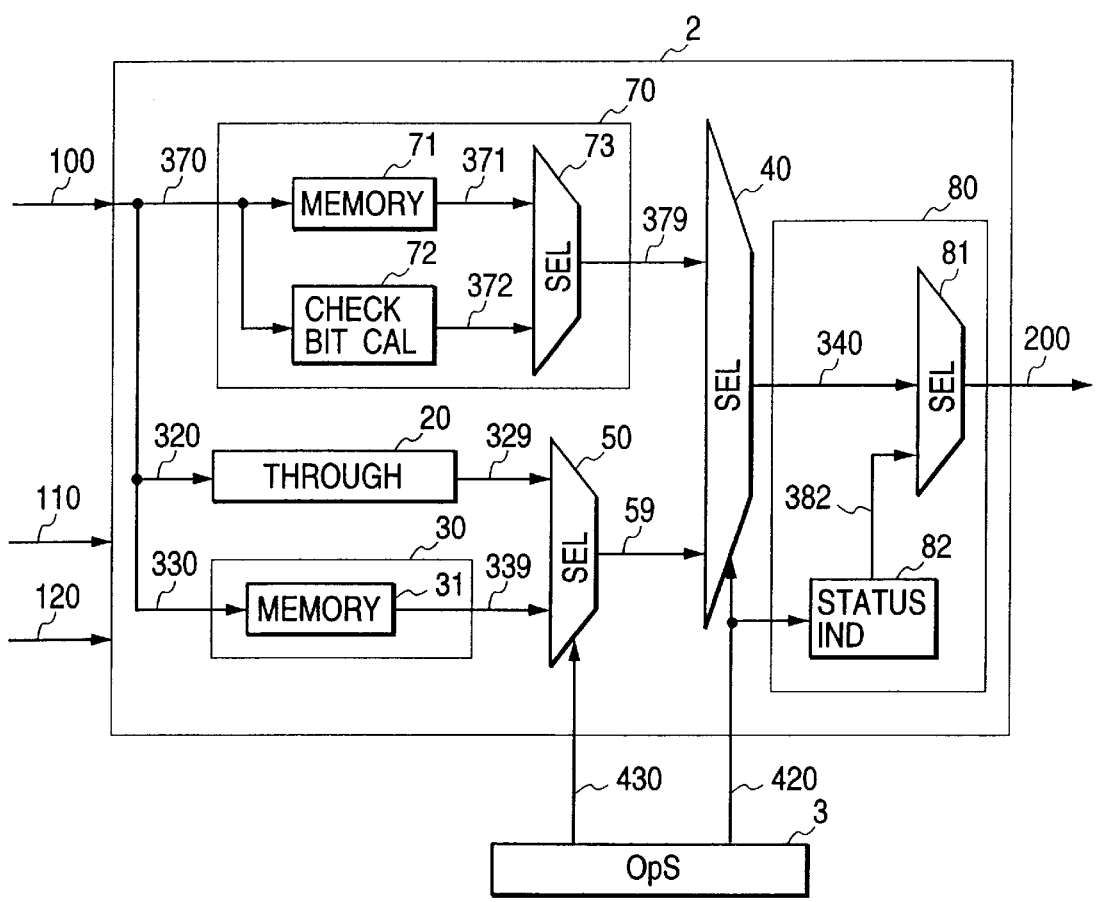
FIG. 5 shows a block diagram of an encoder of an embodiment according to the present invention.

An embodiment of the encoder according to the present invention is shown in FIG. 5. Here, FIG. 5 is the block diagram of the encoder.

In the present embodiment, there is shown the structure of the encoder of "outside", which is explained in the embodiment shown in FIG. 3. The structure of the encoder 2 of the present embodiment differs from that of the decoder 1, being as the embodiment shown in FIG. 2, in aspects that the error correction process portion 10 is replaced by a coding process portion 70, and that an identifier insertion portion 80 is further added therein. The differences will be described in more detail below. However, in the explanation of the present embodiment, the reference numerals are given in similarity to the circuitry of the decoder 1 mentioned above. Therefore, the input 100 and the output 200 of the equipment are given with the same reference numerals. However, the input and output of the encoder equipment and those of the decoder equipment are, of course, different to one another in the signals.

While dividing the data 370 into two (2) series thereof and storing them into the memory 71 one by one, the data is dividedly input from the input data 100, and the coding process portion 70 of the encoder 2 inputs it into a check bit calculation portion 72. The data stored in the memory 71 is read out after passing the constant time "Tk" from the time of writing thereof so that it comes to be the same data series of the original data 370 and is output to the selector 73. The check bit calculation portion 72 calculates out the check bits on the basis of the input data 370 and stores the result thereof, and further it outputs the check bit result 372 to the selector 73 one by one, in synchronism with the check bit area within the corresponding coding block among the data series output from the memory 71.

Further, the check bit calculation portion 72, as is well-known in the art, executes division by a generated polynomial, and the check bit result 372 is the remainder by the division, being output in an order from the coefficient at the higher order side thereof in sequence. The selector 73 outputs the data 371 input as it is, as the data 379, at the timing of the areas except for the check bit, while it outputs the data 372 as the data 379 at the timing of the check bit area.

Figure 6:
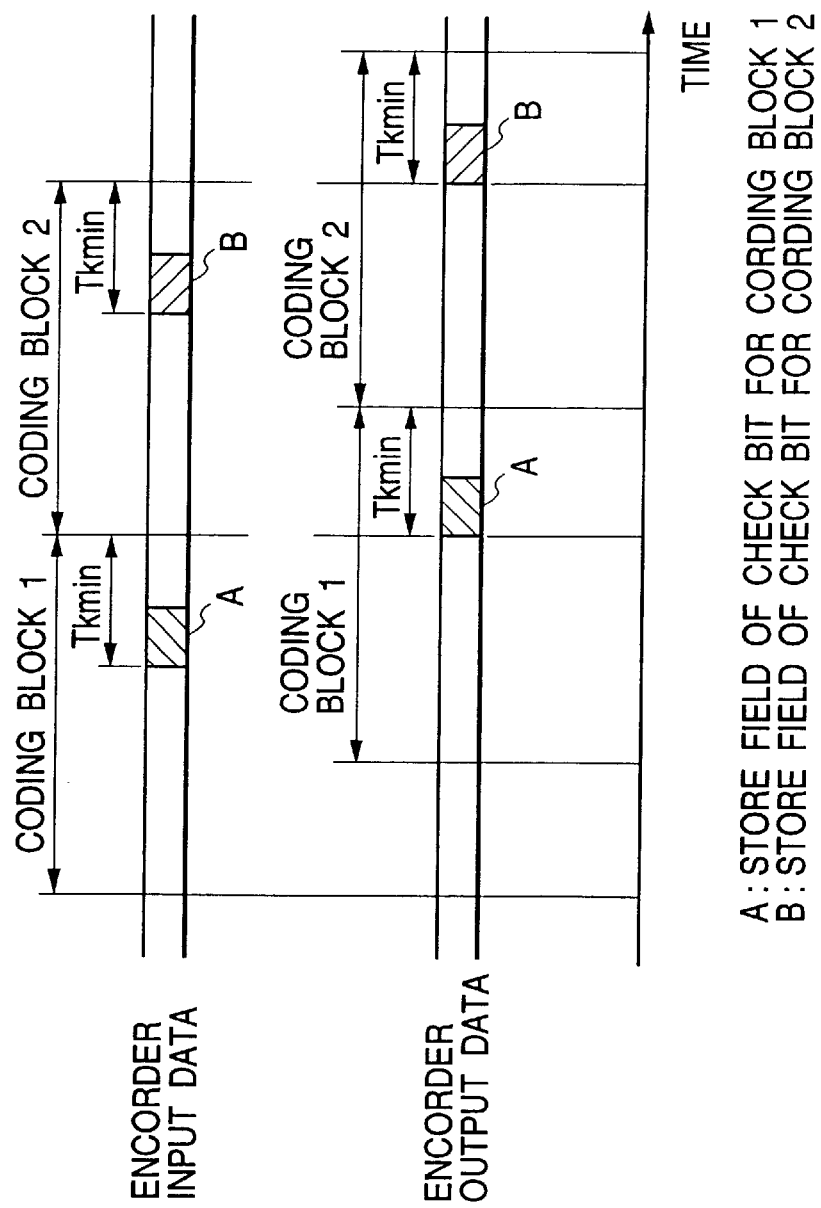
FIG. 6 shows a timing chart for showing delay. occurring in the encoding operation.
Figure 7:
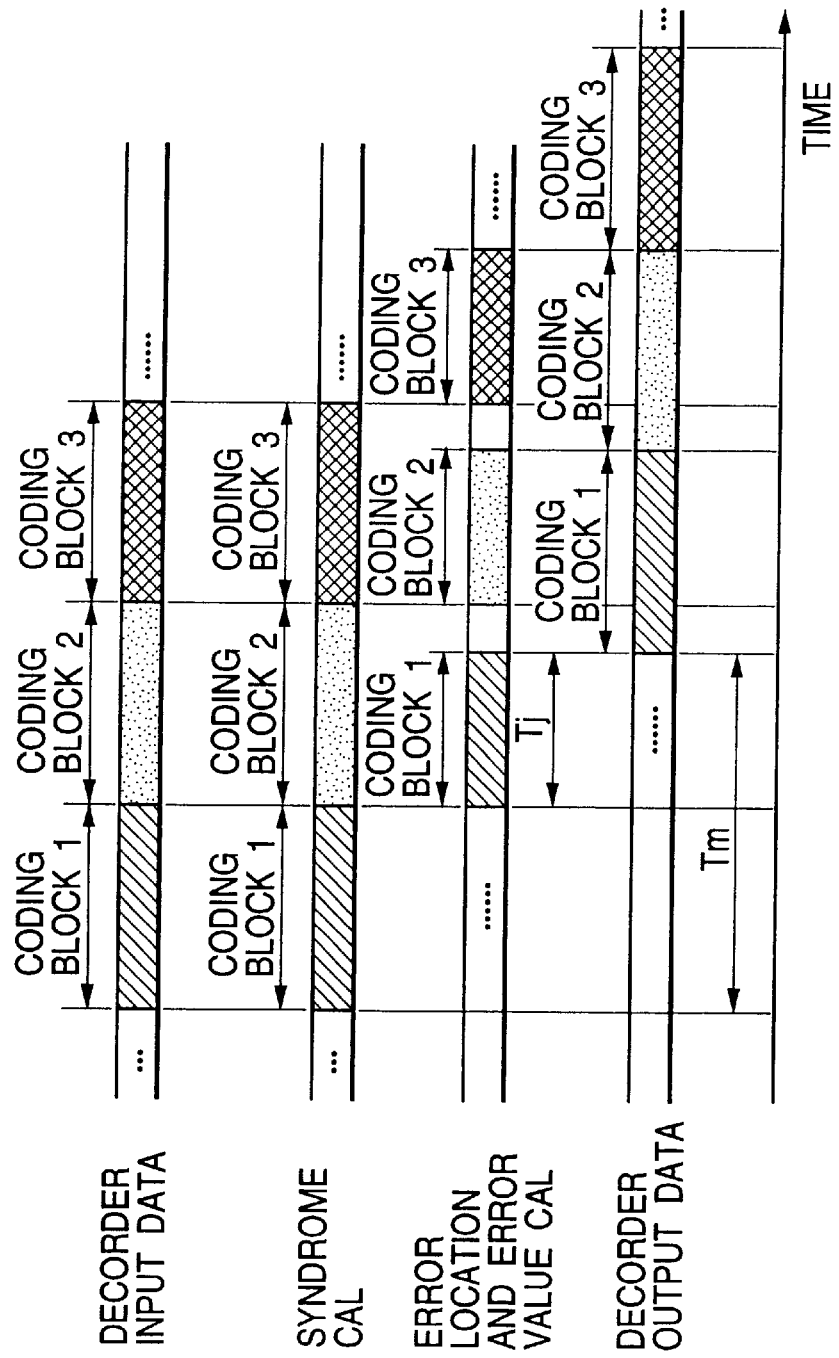
FIG. 7 shows a timing chart for showing delay occurring in the decoding operation.

Here, when storing the check bit for coding into the corresponding coding block, it is enough that the "Tk" is equal or greater than a time difference $Tk_{min}$, from the time period when the check bit area appears first within the coding block until the time point when the last bit to be coded appears within the coding block. FIG. 6 shows the manner in which the delay Tkmin, is generated. Since the calculation of the check bit is completed at the time point when all the bit values in the coding block are input, it is possible to minimize the delay in coding by beginning the output of the check bit at the stage when completing the input of the last bit to be coded (the end of the coding block in FIG. 6) of the coding block.

For example, in a case where the check bit areas are disposed at the end of the coding block concentrically, the last bit to be coded of the coding block comes to be just in front of the check bit area, therefore "Tkmin," is zero (0). Then, the "Tk" may be zero (0), i.e., the memories 71 and 31 are not necessary and they can be constructed with the through connections. This technique of making the "Tk" zero (0) is well-known, in general.

Also, in a case where the check bit for coding is stored into the coding block following the coding block by shifting it one by one, though only the check bit is delayed by one (1) coding block, there is no necessity to delay the data except for the check bit, then the "Tk" may be zero (0), i.e., the memories 71 and 31 are not necessary and they can be constructed with the through connections.

The delay output portion 30 writes the input data 330 into the memory 31. And, in the same manner as in the memory 71, the portion reads it out as the data 339 so that it comes to be the same data series of the original data 330 after passing the constant time "Tk" from the time of writing. However, if the "Tk" is zero (0), the memory 31 is not necessary, and it also can be constructed with the through connection.

Operations in the through output portion 20 and the selector 50 are the same as those in the decoder according to the embodiment shown in FIG. 2. Further, the operation of the selector 40 is also the same as that of the decoder shown in FIG. 2, except that it receives the data 379 from the coding processing portion 70. Namely, in the selector 50, it is selected whether the delay should be dealt with or not when without executing the coding, through the control by the operator outside by external control signal 430, and in the selector 40, it is selected only whether the coding operation should be executed or not, through the control by the operator outside by external control signal 420.

A code status identifier insert portion 80 inserts a code status identifier into the area of the identifier which is defined for each coding block. A status identify pattern generation portion 82 generates pattern signals 382, being different when the coding should be done and when no coding should be done. For example, if the identifier is one byte, the (AA)hex is generated when the coding should be done, while the (00)hex is generated when no coding should be done. The selector 81 selects and outputs the input data 340 when the input data 340 from the selector 40 is outside the area of the identifier in the timing thereof, while it selects and outputs the pattern signal 382 from the status identify pattern generating portion 82 when the input pattern 340 is within the area of the identifier in the timing thereof.

According to the present embodiment, the operator outside can exchange the coding operation between ON and OFF thereof on the input data 100 with ease, and also can obtain the continuous data as the output data 20 without the phase jump even at the moment when it is exchanged, by controlling the selector 50 in advance so that the data 339 is selected therewith, thereby avoiding the ill influence due to the phase jump upon the input data 100 which is under the operation of service thereof. Further, there can be provide a means for deciding the automatic decoding operation on the basis of the identifier, for the outside decoder which receives the output data 200.

Further, in the present embodiment, the memory 31 of the delay output portion 30 and the memory 71 of the coding process portion 70 can be provided or used in common. In this instance, the input 339 to the selector 50 is divided from the output 371 of the memory 71.

Figure 8:
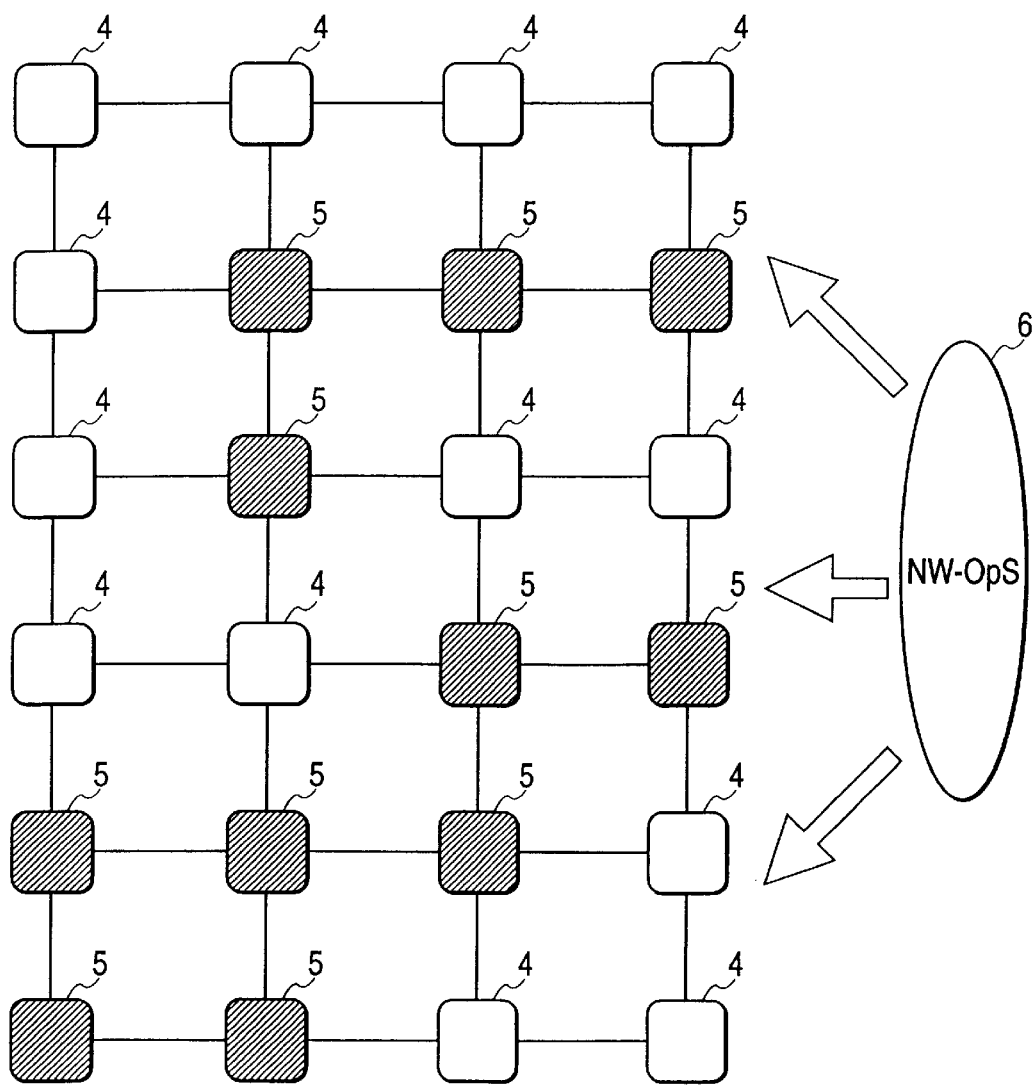
FIG. 8 shows a block diagram of a network into which a management method for the transmission network according to an embodiment of the present invention is applied.

FIG. 8 shows the network configuration, into which is applied the management method for a transmission network according to the present invention. Each of the nodes shown is either an edge node having a multiplexing/demultiplexing function therein, or a regenerating node having regenerating function therein.

Between the nodes is defined a transmission path, wherein the communication between the nodes may be performed in both-sided direction or in one-sided direction. The transmission network is shown in a form of a so-called mesh type network here, however it also can be applied to other than that, such as a linear-type network, a ring-type network, a star type network, or a type combining some of them. The transmission system in FIG. 3 is constructed with nodes (hereinafter, described by FEC node 5) having the encoders and the decoders which are indicated by hatching lines in the drawing, and nodes (hereinafter, described by non-FEC node 4) having no hatching for the encoder and the decoder therein. Also, the error correction is available between the FEC nodes 5,) but unavailable between the other nodes. Of course, all the nodes constructing the network can be the FEC nodes.

In the present embodiment, as the encoder and the decoder of each of the FEC nodes 5 can be applied to the encoder shown in FIG. 5 and also one of the decoders shown in FIGS. 1 to 4, respectively. However, the encoder and the decoder should not be limited only to such structures as described in those embodiments.

A network management operator makes setups in selection of the coding, in selection of the execution of the decoding, and in selection of insertion of the delay into each of the FEC nodes 5, with use of a network management system 6 (NW-OpS).

In more detail, first, in an initial setting, the insertion of the delay for turning OFF the coding and the insertion of the delay for turning OFF the decoding are set to ON. Namely, each of the selectors 50 which are included in each FEC node 5 is controlled to select and output the data signal 339 from the delay output portion 30. However, this setup operation cannot be performed to the FEC node(s) in which the decoder shown in FIG. 1 is applied, since there is provided no such selector 50 therein.

Figure 9:
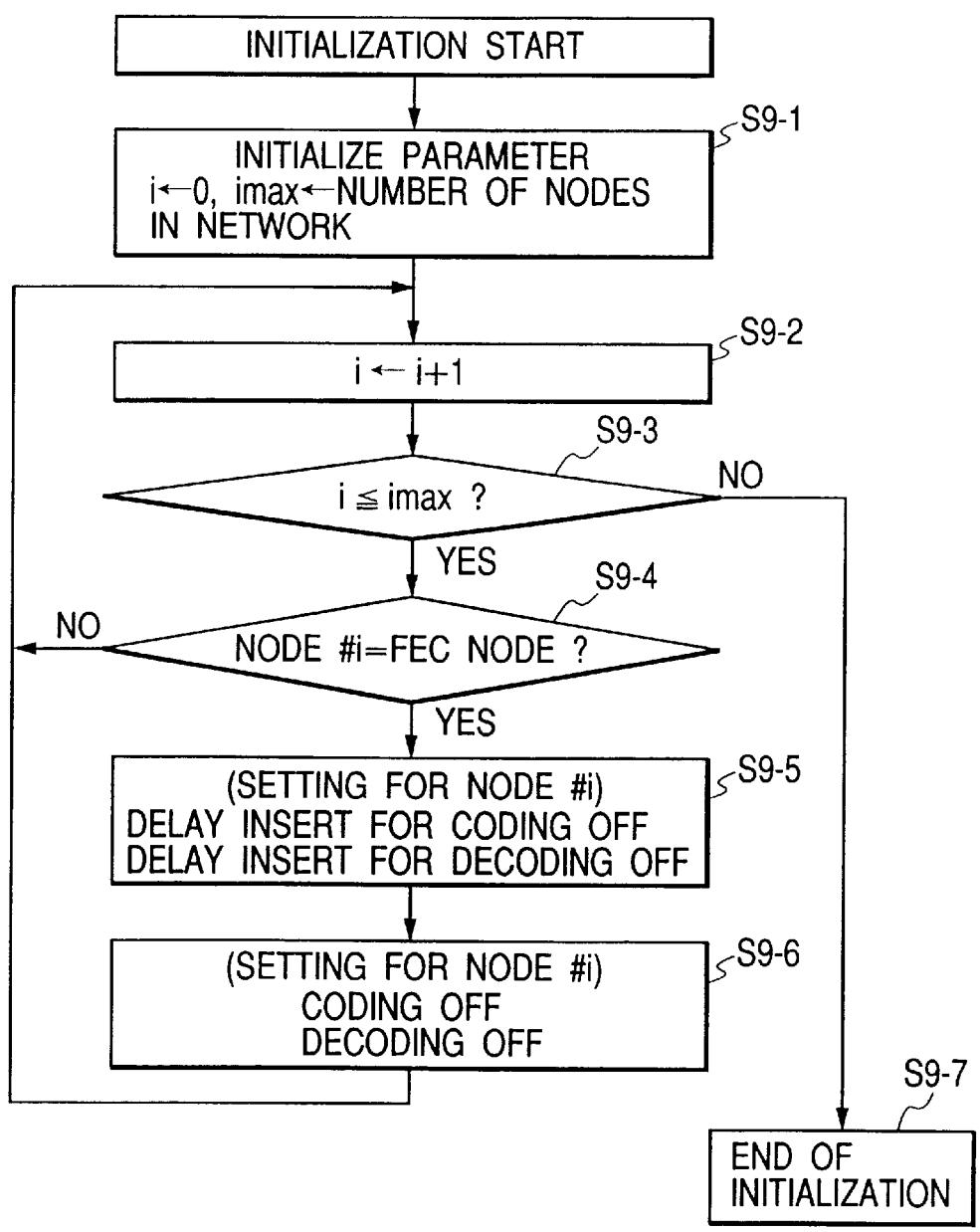
FIG. 9 shows a flow chart for explaining initialization steps in a network management system according to an embodiment of the present invention.

Explanation will be given by referring to FIG. 9. Here, FIG. 9 is a flow chart for explaining steps of the initial setting of the network system.

First, initialization of parameter is executed, wherein the node number within the network is set to be imax (in S9-1). While incrementing a node number i, the steps below are repeated until the i comes to be the imax. (S9-2, 3) When I comes to be imax, initialization is ended (S9-7). Decision is made on whether the node number i is the FEC node or not (S9-4), and the delay for coding OFF and the delay for decoding OFF are inserted when it is the FEC node (S9-5), and further the coding OFFand the decoding OFF are setup (S9-6), thereby completing the initial settings.

After setting up as mentioned above, the settings are made on the ON/OFF selection of the coding and on the ON/OFF selection of the decoding. Here, when it is desired to execute the error correction in any one of the transmission sections, i.e., between the nodes neighboring each other, after selecting the coding of the node being at the upstream side of the transmission section into ON, the decoding of the node at the down stream side thereof is selected into ON. This is because, if the decoding is turned ON in the node at the down stream side before, the error will occur until the setting ON of the coding in the node at the up stream side.

The ON/OFF selection of the coding is setup separately for each FEC node. In more detail, the selector 40 of the encoder shown in FIG. 5, which is provided in each FEC node, is controlled, so that the data signal 379 from the coding process portion 70 is selected and output when the coding is ON, and on the contrary to this, the data signal 59 from the selector 50 is selected and, outputted when the coding is OFF.

The ON/OFF selection of the decoding is also setup separately for each FEC node. In more detail, the selector 40 of the decoder shown in FIG. 1 or FIG. 2, which is provided in each FEC node, is controlled, so that the data signal 319 from the error correction process portion 10 is selected and output when the decoding is ON. On the contrary to this, it is controlled so that the data signal 59 from the selector 50 is selected and output when the decoding is OFF (in the case of applying the decoder shown in FIG. 2), or the data signal 339 from the delay output portion 30 is selected and output when the decoding is OFF (in the case of applying the decoder shown in FIG. 1). However, the present setting cannot be performed for the FEC nodes, in which the decoder shown in FIG. 3 or FIG. 4 is applied.

Figure 10:
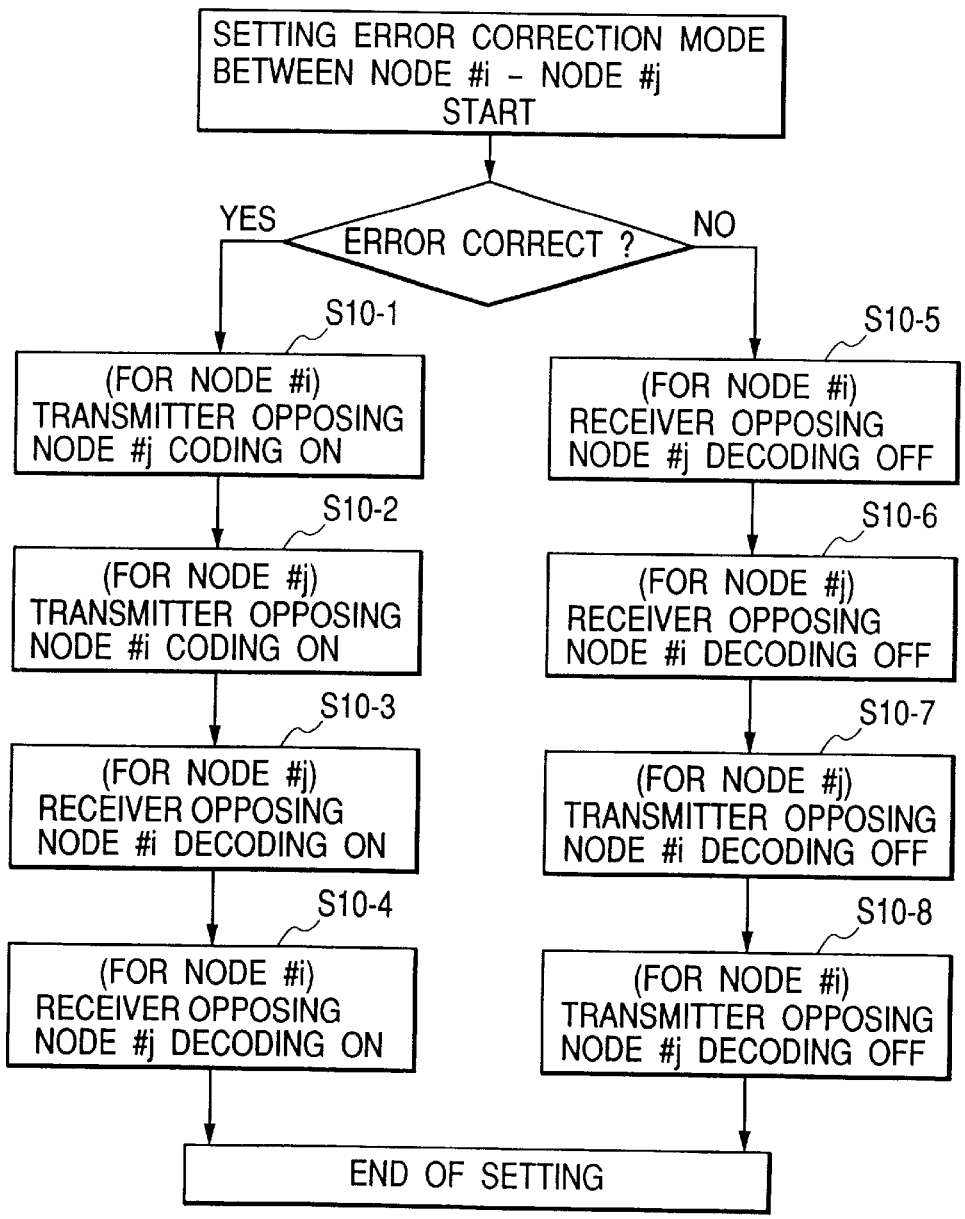
FIG. 10 shows a flow chart for explaining exchange of the setups of coding and decoding operations in the network management system according to the embodiment of the present invention.

Now, explanation will be given on this by referring to FIG. 10. Here, FIG. 10 shows a flowchart for explaining the steps of changing or alternating the settings of the coding and decoding in the network system.

The steps for changing the settings of the error correction between the node i and the node j will be described below. First of all, when changing from the non-execution(OFF)of the error correction into the execution (ON),the coding of a transmitter of the node i opposing the node j is turned ON (S10-1). Next, the coding of the transmitter of the node j opposing the node i is turned ON (S10-2), and the decoding of a receiver opposing the node i is turned ON (S10-3). Thereafter, the receiver of the node i opposing the node j is turned ON (S10-4).

Next, when exchanging from the execution (ON) of the error correction into the non-execution (OFF), first the decoding of the receiver of the node i opposing the node j is turned OFF (S10-5). Next, the decoding of the receiver of the node j opposing the node i is turned OFF(S10-6), and the coding of the transmitter opposing the node i is turned OFF (S10-7). Thereafter, the coding of the transmitter of the node i opposing the node j is turned OFF (S10-8).

As is mentioned in the above, by setting the insertion of delay for the coding and decoding OFF into ON in advance, it is possible to freely control the ON/OFF of the coding and the decoding, without bringing about the phase jump in the signal data, even when the circuit of each transmission path comes to be under the operation of service, thereafter.

However, the setting steps of the above can be performed successively by the network management operator, or can be installed into the network management system in advance in the form of software thereof. In the case of the latter, if the operator selects whether the error correction should be executed or not between the FEC nodes, for example, the series of the setting operations mentioned above are executed by the program, and so on.

Further, it is also possible, as the initial setting, to setup the coding into the ON condition for all of the FEC nodes, as well as the delay insertion for the coding and decoding OFF for all of the FEC nodes. In doing so, it is enough to control only the ON/OFF exchange of the decoding for each FEC node, and it is not necessary to take into consideration the order of the coding control and the decoding control, thereby obtaining simplification in the network management system.

This will be explained by referring to FIGS. 11 and 12. Here, FIG. 11 shows the flowchart for explaining the steps of initial setting of the network management system, and FIG. 12 shows the flowchart for explaining the steps of changing in the setting of the coding and the decoding in the network management system.

Figure 11:
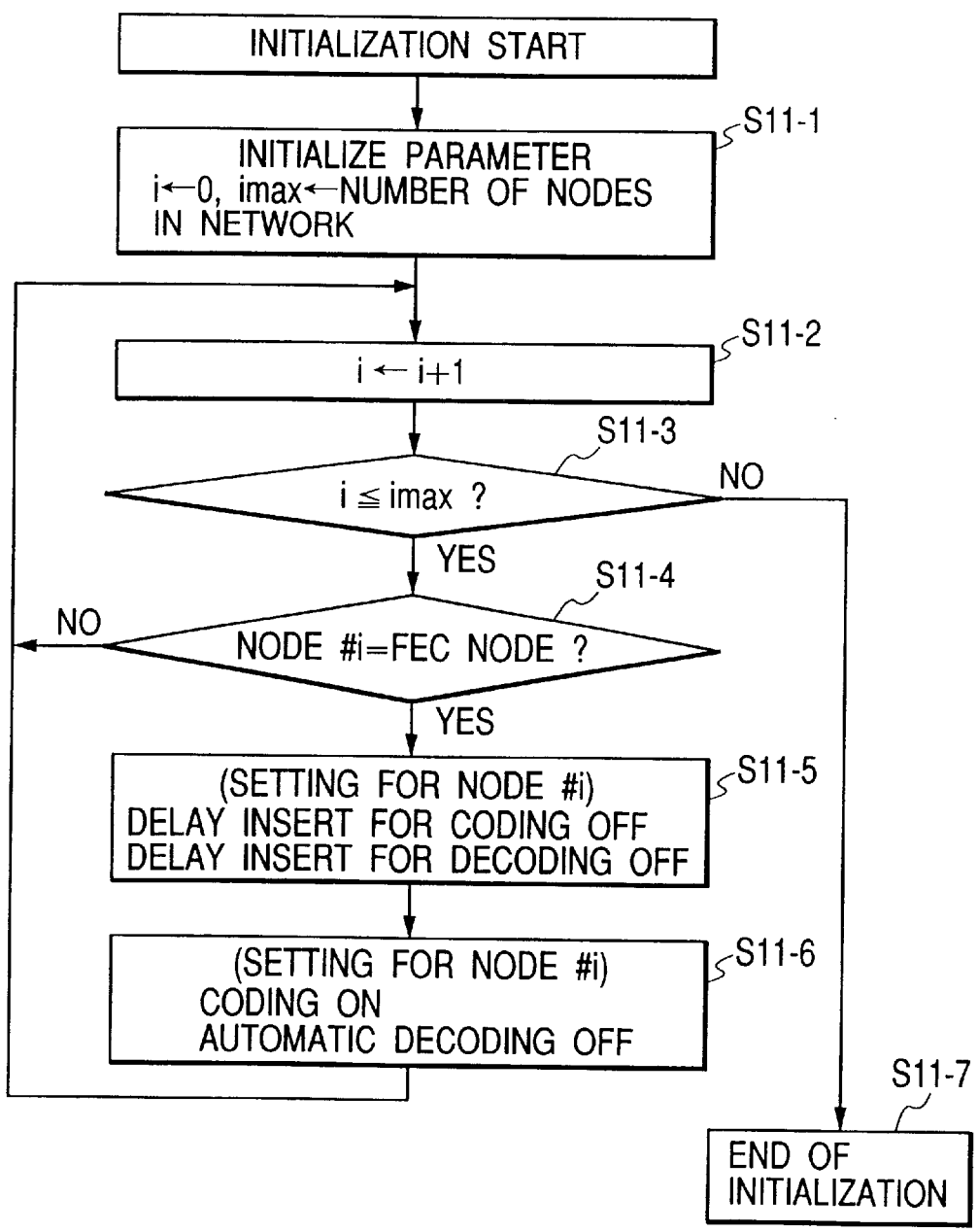
FIG. 11 shows a flow chart for explaining initialization steps in a network management system according to another embodiment of the present invention.
Figure 12:
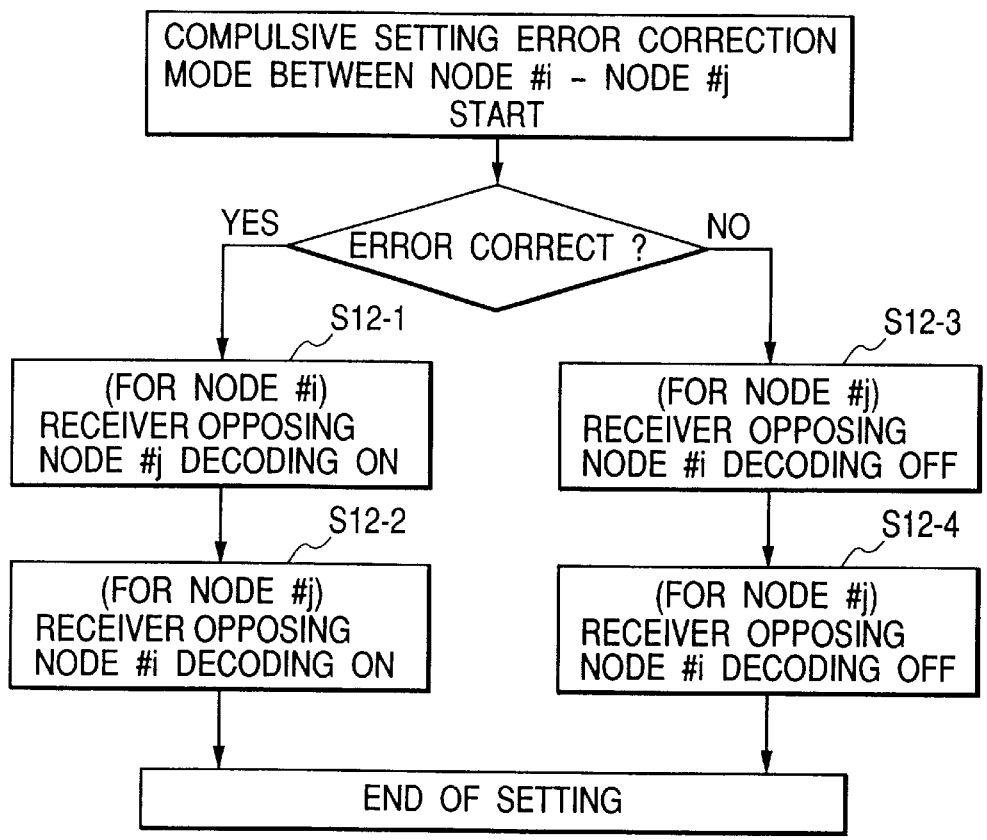
FIG. 12 shows a flow chart for explaining exchange of setups of the coding and decoding operations in the network management system according to the another embodiment of the present invention.

Referring to FIG. 11, first the initialization is executed on the parameters so as to set the node number within the network into the imax (S11-1). While incrementing the node number i, the following steps are repeated until it reaches to the imax. (S11-2, 3) Deciding whether the node number i is the FEC node or not (S11-4), the delay for the coding OFF and the delay for the decoding OFF are inserted if it is the FEC node (S11-5), and the coding ON and the automatic decoding ON are setup (S11-6),thereby completing the initial setting (S11-7).

Steps of changing the settings of the error correction between the node i and the node j will be described below, by referring to FIG. 12. First of all, when exchanging from the non-execution (OFF) of the error correction into the execution (ON), the decoding of the receiver of the node i opposing the node j is turned ON (S12-1). Thereafter, the receiver of the node j opposing the node i is turned ON (S12-2). Those orders can be reversed and vice versa.

Next, when exchanging from the execution (ON) of the error correction into the non-execution (OFF), first the decoding of the receiver of the node i opposing the node j is turned OFF (S12-3). Next, the decoding of the receiver of the node j opposing the node i is turned OFF (S12-4). Those orders also can be reversed and vice versa.

Further, with applying the decoder according to the embodiment shown in FIG. 3 or FIG. 4 into the decoder of the FEC node, it is not necessary for the network management system or the operator to designate the selection of the decoding for each of the FEC nodes, thereby achieving a very easy and simple network management system in which only the initial setting needed.

Also, when the network management system supervises the error rate for each of the transmission sections, the ON/OFF exchange of the coding and the ON/OFF exchange of the decoding for each FEC node can be setup on the basis of the error rate and/or error number in the corresponding transmission section. For example, the threshold value of the error rate is setup for the network management system and is memorized therein in advance, and the decoding of the corresponding FEC node is set into the ON condition only when the error rate of the transmission section exceeds the threshold value, or into the OFF condition, and so on. However, this control cannot be performed for the FEC nodes into which the decoder of the embodiment shown in FIG. 3 or FIG. 4 is applied.

Figure 13:
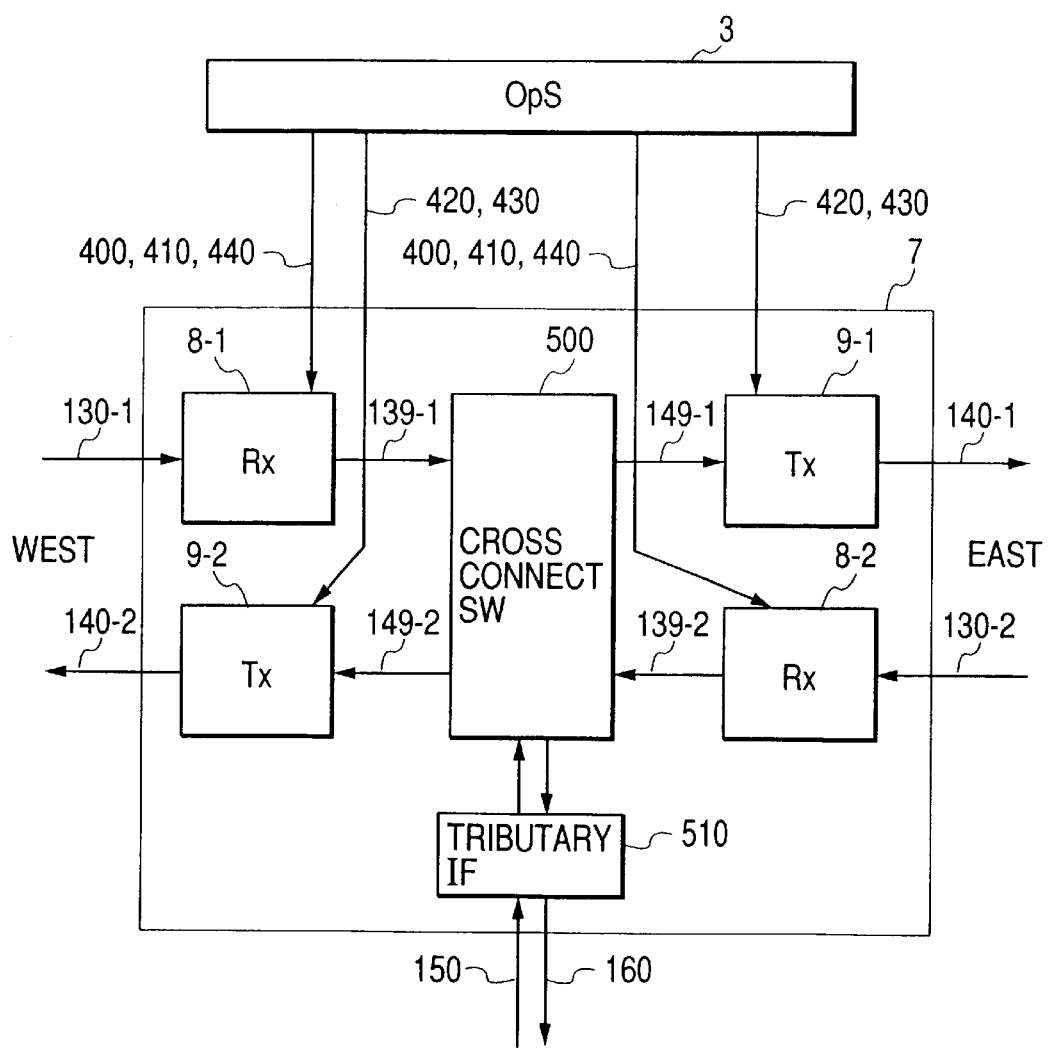
FIG. 13 shows a block diagram for explaining the construction of a node according to the embodiment of the present invention.

An another embodiment of the node according to the present embodiment will be explained by referring to FIGS. 13, 14 and 15. Here, FIG. 13 shows the block diagram for explaining the structure of the node, FIG. 14 the block diagram for explaining the structure of the transmitter, and FIG. 15 the block diagram for explaining the structure of the receiver.

The present embodiment is a node which is called by add drop multiplexer (ADM) 7 and is applied into a ring network system. An optical signal 130-1 transmitted from the left-hand side in the drawing (i.e., West side) is converted into an electric signal 139-1 within the receiver 8-1 and is sent out into a cross connect switch 500. In the same manner, the optical signal 130-2 transmitted from the right-hand side (i.e., East side) is also converted into an electric signal 139-2 within the receiver 8-2 and is sent out into the cross connect switch 500. Also, the signal inserted from the distribution side 150 is sent out into the cross connect switch 500 from an interface 510 at the distribution side.

The cross connect switch 500 sends out the signals 149-1 or 149-2 into the transmitters 9-1, 9-2 or the interface of the distributor side, depending upon the destination of sending thereof. The signal 149-1 sent out into the transmitter 9-1 is converted into an optical signal 140-1, and is sent out into the transmission path at the right-hand side ( East side). In the same manner, the signal 149-2 sent out into the transmitter 9-2 is also converted into the optical signal 140-2 and sent out into the transmission path at the left-hand side ( West side). The signal 160 sent out from the interface 510 of the distribution side is dropped out by decreasing the transmission velocity thereof.

The receiver 8 and the transmitter 9 constructing the add drop multiplexer 7 can be exchanged in the execution (ON)/nonexecution(OFF) of the coding and execution(ON)/ nonexecution(OFF) of the decoding through the control from the operating system 3. This will be explained by referring to FIGS. 14 and 15.

Figure 14:
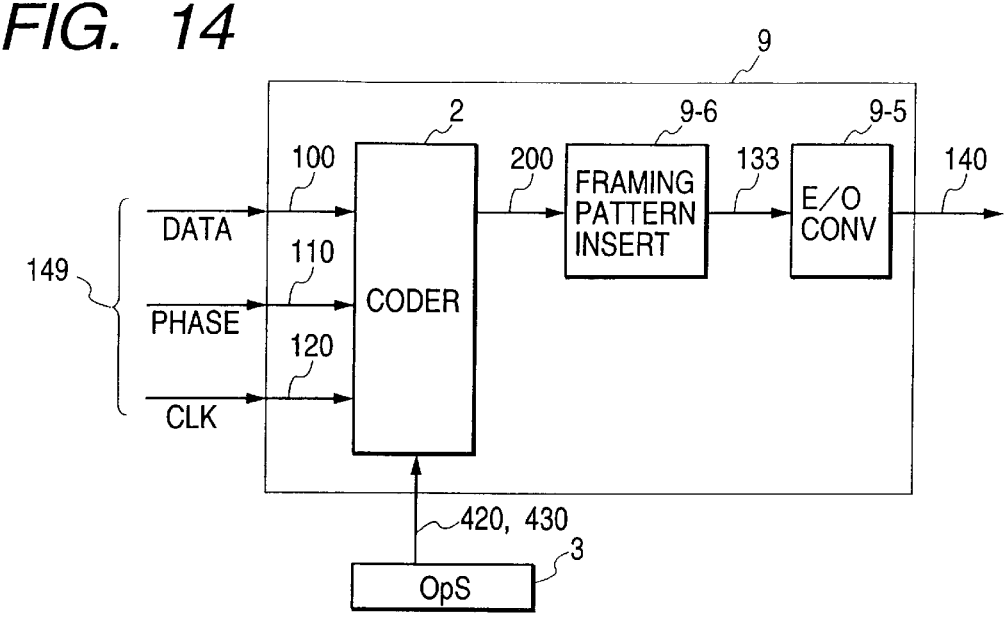
FIG. 14 shows a block diagram for explaining the construction of a transmitter according to the embodiment of the present invention.

The transmitter shown in FIG. 14 is constructed with an encoder 2 receiving input signal 149, a frame pattern insertion portion 9-6, and an electric-photo converter portion 9-5 outputting output signal 140. The encoder 2 exchanges the execution (ON)/non-execution (OFF)of the coding through the control from the operation system 3.

Figure 15:
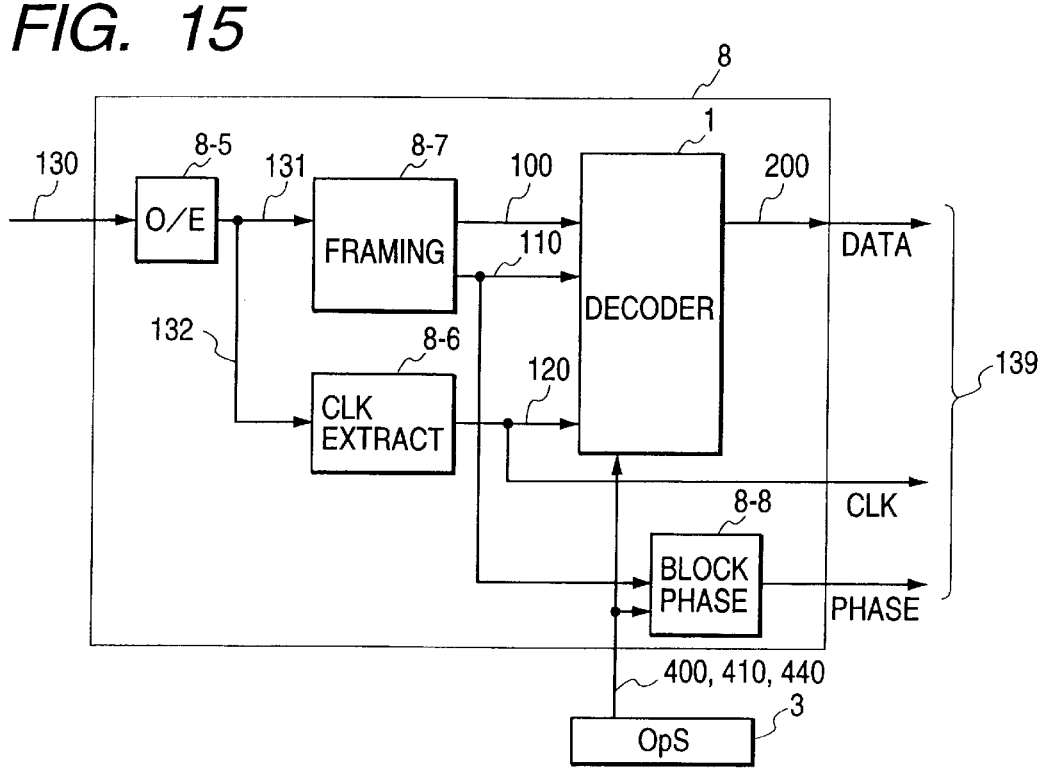
FIG. 15 shows a block diagram for explaining the construction of a receiver according to the embodiment of the present invention.

The receiver shown in FIG. 15 is constructed with a photo-electric converter portion 8-5 receiving input signal 130, a clock sampling and dividing portion 8-6 for extracting a clock from the electric signal 132, a frame synchronization process portion 8-7 for obtaining frame synchronization from signal 131, a block phase generator portion 8-8, and a decoder 1 which inputs the data 100 from the frame synchronization process portion 8-7 and the clock, from the clock sampling and dividing portion 8-6. The decoder 1 exchanges the execution (ON)/non-execution (OFF) of the decoding through the control from the operation system 3. The receiver 8 outputs output signals 139.

The embodiment of the transmission apparatus shown in FIG. 14 or FIG. 15 is not only applicable to the add drop multiplexer shown in FIG. 13, but is also applicable to a 1:1 transmission. Also, it is applicable to the linear-type network, the ring-type network, the star-type network, and further to the transmission apparatus of combined networks.

The transmission apparatus explained in either one of FIGS. 13 to 15 includes the encoder or the decoder, having a delay circuit therein. Because of this, the phase jump, such as the omission or duplication of the data will not occur when changing over the execution(ON)/non-execution (OFF)of the coding or the execution(ON)/non-execution (OFF)of the decoding.

With use of the encoder and the decoder according to the present invention, there can be constructed a transmission system, wherein an operator managing the network can easily perform operation thereof, without the necessity of deciding whether the decoding is available for each of the transmission sections, even when the structure of the network becomes complex or altered. Further, according to the present invention, there also can be provided a transmission apparatus and an encoder and a decoder thereof, in which the coding and the decoding can be freely changed or turned to be executed(ON)or not executed(OFF), without such ill influence upon the signals on the circuit under the operation of service due to the phase jump.

What is claimed is:

1. A transmission apparatus for transmitting an optical signal, comprising:
   an encoder for error correction, including:
      a coding process portion which codes a digital signal, being time-division multiplexed within a constant cycle frame, into a forward error correcting code;
      a delay portion which delays said digital signal by a predetermined time;
      a through output portion which outputs said digital signal without delaying;
      a first selector portion which receives the output from said delay portion and the output of said through portion and outputs one of those, selectively;
      a second selector portion which receives the output of said coding process portion and the output of said first selector portion and outputs one of them, selectively; and
      an electric-photo converter portion for converting an electric signal into an optical signal.

2. A transmission apparatus as described in the claim 1, wherein said digital signal is transmitted with using SDH in accordance with ITU-T recommendation G.707 or SONET in accordance with ANSI standard T1.105.

3. A transmission apparatus as described in the claim 1, further comprising:
   an identifier pattern adding portion which adds information for coding to a portion of the output signal of said second selector portion.

4. A transmission apparatus as described in the claim 1, wherein the time to be delayed in said delay portion includes a fixed time which is determined in advance.

5. A transmission apparatus as described in the claim 1, wherein the time to be delayed in said delay portion includes at least a time which is necessary for coding the digital signal into the forward error correcting code in said coding process portion.

6. A transmission apparatus as described in the claim 1, wherein said first selector portion and said second selector portion are controlled upon basis of a control signal from an outside.

7. A transmission apparatus for transmitting an optical signal, comprising:
   an encoder for error correction, including:
      a coding process portion for coding a digital signal, which is time-division multiplexed within a transmission frame of a constant period, into a forward error correcting code;
      a delay portion for delaying for a predetermined time period, so as to align said digital signal and an output signal of said coding process portion in phases thereof;
      a through output portion for outputting said digital signal without giving a delaying thereon;
      a first selection portion for receiving an output of said delay portion and an output of said through portion, thereby selectively outputting one of them;
      a second selection portion for receiving an output of said delay portion and an output of said through portion, thereby selectively outputting one of them; and
      an electric-photo converter portion for converting an electric signal into an optical signal.

8. A transmission apparatus as defined in the claim 7, wherein said digital signal is that, which is transmitted at a constant fixed period with using either one of SDH in accordance with G.707 of ITU-T recommendation and SONET in accordance with ANSI standard T1.105.

9. A transmission apparatus as defined in the claim 7, further comprising an identifier pattern adding portion for adding information for coding onto a portion of the output signal of said second selection portion.

10. A transmission apparatus as defined in the claim 7, wherein the time period delayed in said delay portion is a constant fixed time period which is determined in advance.

11. A transmission apparatus as defined in the claim 7, wherein the time period delay in said delay portion is at least a time period, being necessary for the forward error correction coding in said coding process portion.

12. A transmission apparatus as defined in the claim 7, wherein said first selection portion and said second selection portion are controlled upon basis of a control signal from an outside.

* * * * *